3,071,302
Patented Jan. 1, 1963

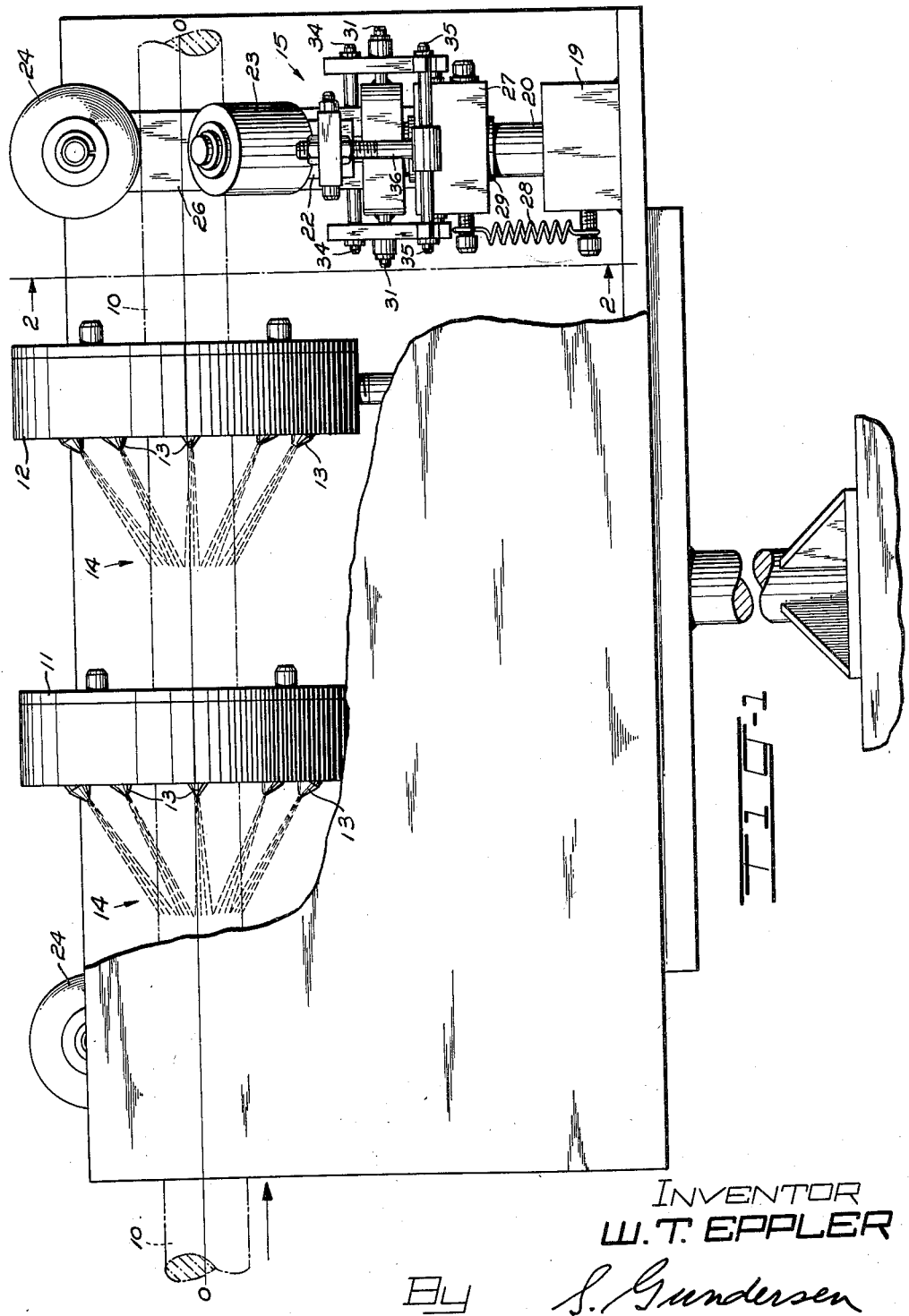

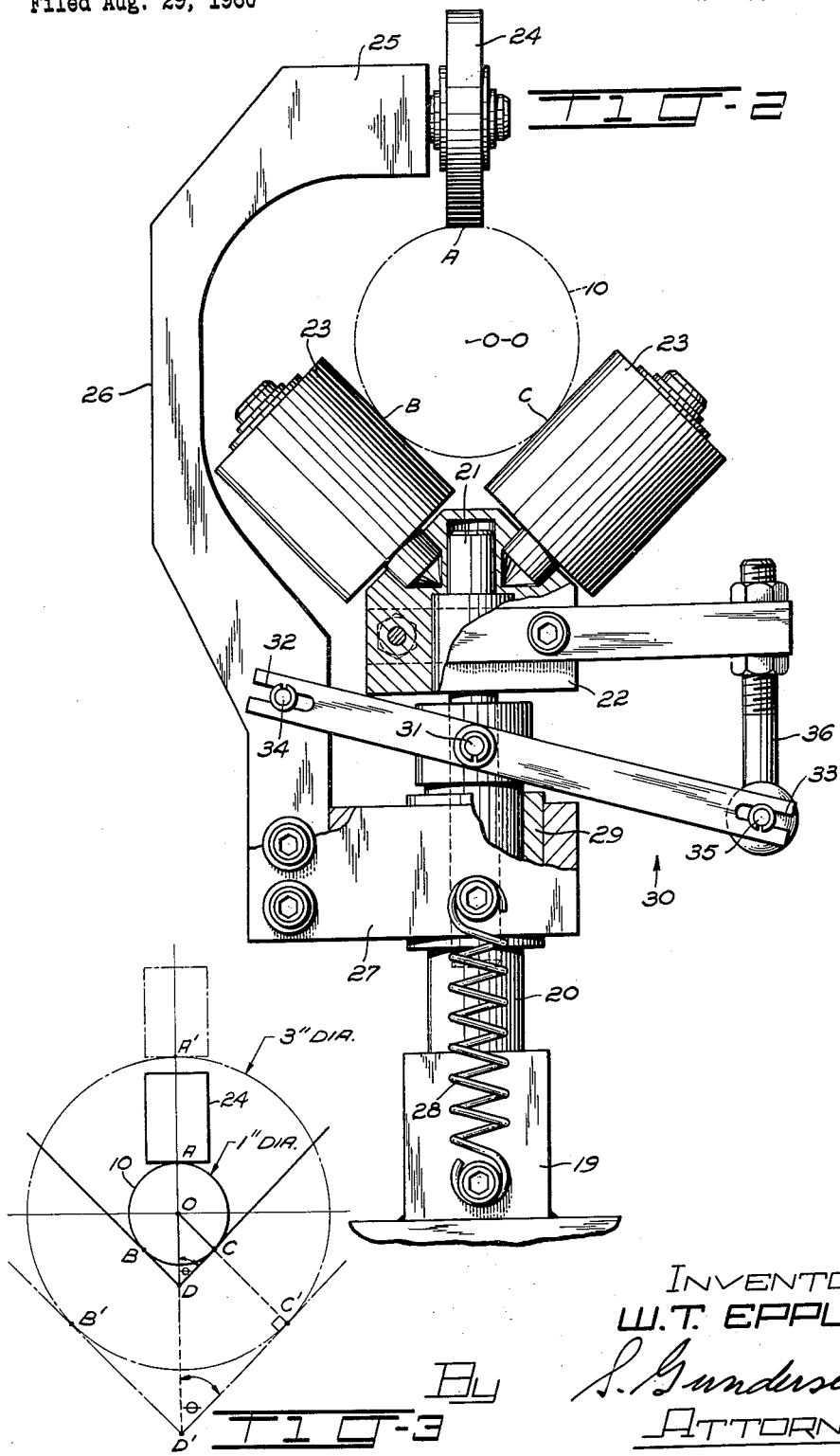

3,071,302
AUTOMATIC CENTERING MECHANISM
Walter T. Eppler, Cranford, N.J., assignor to Western Electric Company, Incorporated, New York, N.Y., a corporation of New York
Filed Aug. 29, 1960, Ser. No. 52,480
5 Claims. (Cl. 226—191)

This invention relates to centering mechanisms and particularly to an automatic centering mechanism for a longitudinally advancing article, such as a cable, pipe, rod, hose, etc.

In the manufacture of elongated cylindrical articles, it is sometimes necessary to maintain the article on a prescribed path for various operational reasons. For example, in the production of electric cable, a required capacitance type thickness test is made by a sensing probe which contacts the surface of a cable after it passes from a water cooling medium through a pair of circular air blower wipers. With such an arrangement, it is mandatory that the central axis of the cable be coincident with the central axis of the air blower to insure that all the moisture be removed from the cable surface so that an accurate measurement is obtained. Heretofore, the centering, guiding or positioning mechanisms utilized required manual adjustments for different size cables. Also, no provision was made for variations in the diameter size of an advancing cable and consequently inaccurate measurements were obtained due to the incomplete removal of water from the surface of the cable.

The object of this invention is a centering mechanism for automatically maintaining the central axis of a longitudinally advancing article, such as a cable, along a fixed axial line regardless of diameter size variations.

In a preferred embodiment according to the object, the centering mechanism includes a first contacting element, such as a pair of V rollers upon which the cable rides, and a second element in contact with the opposite side of the cable, the elements being normally urged towards each other defining a path through which the cable advances. The opposing elements are linked together to move in opposite directions towards and away from the central axis of the cable so that as the cable is longitudinally advanced through the centering mechanism, the central axis of the cable is maintained on the fixed axial path regardless of any variation in diameter size.

Other objects and a fuller understanding of the invention may be had by referring to the following description and claims, taken in conjunction with the accompanying drawing, in which:

FIG. 1 is a side view of the cable passing through the air blowers and centering mechanism; and FIG. 2 is a sectional view of the centering mechanism as seen from the plane of line 2—2 of FIG. 1; and FIG. 3 is a schematic view illustrating the vertical distance of travel of the mechanism.

With reference to FIGS. 1 and 2 of the drawing, a cable 10, passing from a water trough (not shown) through a pair of air blower wipers 11 and 12, is required to have its central axis maintained on the axial line O—O, the central axis of the cable being coincident with the central axis of the wipers. The wipers are provided with a plurality of air jets 13 angularly disposed to the cable so that the air stream 14 forms a cone, the apex of the cone theoretically being located at the central axis of the cable to effectuate a maximum removal of water from the cable surface.

The central axis of the cable is maintained automatically and accurately on the axial line O—O, regardless of cable diameter size, by two centering mechanisms 15, one of which is located in front of wiper 11 and the other behind wiper 12. The mechanism is comprised of a base 19 having a support column 20 in which a shaft 21 is vertically movable. A yoke or roller unit 22, slidable on shaft 21, is equipped with a pair of cylindrical rollers 23 forming a 90° V configuration for contacting and holding the lower portion of the cable. A vertically disposed top wheel or roller 24, located opposite the midpoint between the V rollers, contacts and exerts a downward force on the top portion of the cable to hold it in contact with the V rollers 23. The rollers define a path for the cable as hereinafter explained but it is noted that instead of rollers any similar contacting, guiding or skidding elements may be used.

The top wheel 24 is mounted on one end 25 of an arm 26, and a lower weighted portion 27 is connected to a sleeve 29 slidable on column 20. A lever 30, pivotally connected to the shaft at 31, has bifurcated ends 32 and 33 slidable along studs 34 and 35 respectively, the studs being located on the arm 26 and a connecting rod 36 extending from the roller unit 22. The weighted portion 27 urges the wheel 24 down into contact with the top of the cable 10 and through the lever 30 to urge the V rollers up into contact with the lower portion of the cable. In order to insure adequate force being exerted by the rollers 23 and 24 against the cable, a spring 28 may be connected between the sleeve 29 and base 19. While the whole mechanism is shown operable along a known vertical center line, the mechanism may be disposed at any angle around the cable.

As seen in FIGS. 2 and 3, the top wheel 24 is in line with the vertical center line of the cable 10 such that the distance from the axial line O—O to the cable contacting point A of the top wheel 24 is equal to the radius of the cable while the cable contacting points B and C of the V rollers are disposed preferably at a 45° angle with respect to the vertical center line. It is noted that the relative disposition of the V rollers to the top wheel need not necessarily be limited to the vertical center line of the cable as they can be arranged along any extended diameter line of the cable. With this arrangement, upon any variation in the diameter size of the cable, the theoretical vertical distance of travel from the axial line for the cable contacting points B and C of the V rollers is more than the vertical distance of travel for the top wheel, the vertical distance being equal to $$\frac{1}{\text{cosine}}$$

of the angle $\theta$ where $\theta$ is the angle formed by the axis of the roller and the extended diameter line of the cable. In other words, for every inch of travel for the cable contacting point of the top wheel the vertical distance of travel for the cable contacting point of the V rollers is 1.4 inches. This is schematically illustrated in FIG. 3 wherein the diameter of cable 10 is increased from 1 inch to 3 inches. In the 1 inch cable, lines OA, OC, and CD=.5 inch and line $$OD = \frac{.5}{\text{cosine } 45°}$$

or .707 inch. With the 3 inch cable, lines OA', OC', and C'D'=1.5″, and line $$OD' = \frac{1.5}{\text{cosine } 45°}$$

or 2.1 inches. Thus, the vertical distance of travel from A to A' (1.5−0.5) for the top wheel is 1 inch and the vertical distance of travel from D to D' (2.1−.707) for the V rollers is 1.4 inches.

In order to maintain the central axis of the cable along the fixed axial path O—O, the lever pivotal connection 31 is proportioned such that the lever arm length extending from the pivot 31 to the stud engaging portion of the end 32, as compared to the lever arm length extending from the pivot 31 to the stud engaging portion of the end 33, is fixed at a 1 to 1.4 ratio. It is to be understood that the V rollers 23 can be set at any desired angle with a corresponding proportioning of the lever pivotal connection, the ratio of the lever pivot to its respective contacting ends being equal to the ratio of the radius of the advancing cable and $$\frac{1}{\text{cosine } \theta}$$

In operation, as the cable 10 passes through the mechanism, the central axis of the cable is maintained coincident with the axial line O—O due to the top wheel 24 and V rollers 23 automatically being urged towards and away from each other with respect to the central axis of the cable regardless of any variation in its size. Thus, in the event there is an increase in the diameter size of the cable, the top wheel moves upwardly and the V rollers move downwardly simultaneously from the central axis of the cable. Similarly, upon a decrease in the diameter size of the cable, the top wheel moves downwardly and the V rollers move upwardly simulttaneously towards the central axis of the cable.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A mechanism for maintaining the central axis of a longitudinally advancing article along a fixed axial path which comprises a first rolling means for engaging one side of the article, a second rolling means for engaging the opposite side of the article, means for normally urging the first and second rolling means towards each other against the article, a first member connected to the first rolling means, a second member connected to the second rolling means, a pivotally mounted bar having ends respectively connected to the first and second members for automatically actuating simultaneously the first and second rolling means in opposite directions with respect to the central axis of the article as its diameter varies to maintain the central axis along the fixed axial path.

2. A mechanism for maintaining the central axis of a longitudinally advancing article along a fixed axial path which comprises a pair of angularly disposed rollers bisected by an extended diameter line of the cable for engaging the article, said diameter line and the axis of each roller forming an angle $\theta$, another roller opposed to the pair of rollers on the extended line for engaging another part of the article, means urging the other roller towards the pair of rollers, a member vertically disposed beneath the pair, a roller unit secured near one end of the member for holding the pair, a lever pivotally mounted on the member and having ends contacting the urging means and roller unit for automatically actuating simultaneously the pair of rollers and other roller in the opposite direction from each other with respect to the central axis of the article as its diameter varies to maintain the central axis along the fixed axial path.

3. A mechanism according to claim 2 in which the ratio of the lever pivotal connection to its respective contacting ends is equal to the ratio of the radius of the advancing cable and $$\frac{1}{\cos . \theta}$$

4. A mechanism according to claim 2 in which each roller of the pair of rollers is at a 45° angle with respect to one extended diameter line of the article, and the length of the lever from the pivotal connection to its respective contacting ends is at a 1 to 1.4 ratio.

5. A mechanism according to claim 1 in which the first rolling means is a roller and the second rolling means is a pair of angularly disposed rollers, the roller and pair of rollers making a three-point contact with the article and being bisected by an extended diameter line of the article.

References Cited in the file of this patent

UNITED STATES PATENTS

| | | |
|---|---|---|
| 2,657,879 | Pike | Nov. 3, 1953 |
| 2,783,025 | Scheidt | Feb. 26, 1957 |
| 2,923,333 | Nicholson | Feb. 2, 1960 |
| 2,948,513 | Krohn-Holm | Aug. 9, 1960 |

FOREIGN PATENTS

| | | |
|---|---|---|
| 426,255 | Germany | Mar. 9, 1926 |
| 303,271 | Great Britain | Jan. 3, 1929 |